(12) United States Patent
Arai

(10) Patent No.: US 11,550,237 B2
(45) Date of Patent: Jan. 10, 2023

(54) SCANNING OPTICAL SYSTEM AND IMAGE FORMING APPARATUS

(71) Applicant: CANON KABUSHIKI KAISHA, Tokyo (JP)

(72) Inventor: Kazuhiro Arai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 17/063,443

(22) Filed: Oct. 5, 2020

(65) Prior Publication Data
US 2021/0109455 A1   Apr. 15, 2021

(30) Foreign Application Priority Data

Oct. 11, 2019 (JP) .............................. JP2019-187964
Sep. 11, 2020 (JP) .............................. JP2020-153004

(51) Int. Cl.
*G03G 15/04* (2006.01)
*G02B 26/08* (2006.01)
*G02B 3/08* (2006.01)
*G02B 3/02* (2006.01)
*G02B 3/00* (2006.01)

(52) U.S. Cl.
CPC .......... *G03G 15/04036* (2013.01); *G02B 3/02* (2013.01); *G02B 3/08* (2013.01); *G02B 26/0816* (2013.01); *G02B 2003/0093* (2013.01)

(58) Field of Classification Search
CPC ........ G02B 3/02; G02B 3/08; G02B 26/0816; G03B 15/04036
See application file for complete search history.

(56) References Cited

U.S. PATENT DOCUMENTS

2009/0073529 A1\* 3/2009 Imai ................ G03G 15/04036
                                                      359/204.1
2020/0057402 A1\* 2/2020 Teramura ............. G02B 26/125

FOREIGN PATENT DOCUMENTS

JP          2011-154115 A       8/2011

\* cited by examiner

*Primary Examiner* — Hoang X Ngo
(74) *Attorney, Agent, or Firm* — Canon U.S.A., Inc. IP Division

(57) ABSTRACT

A system includes a light source, a deflection unit configured to deflect a light beam having a wavelength λ emitted from the light source, and a lens unit including a plurality of lenses that focuses deflected light on a surface to be scanned, at least one lens among the plurality of lenses has a micro concavo-convex structure in an optical surface, and the optical surface having the micro concavo-convex structure has a transmittance distribution for the light beam having the wavelength λ according to a light quantity distribution of the deflected light and entering the lens unit.

20 Claims, 10 Drawing Sheets

SCANNING OPTICAL SYSTEM AND IMAGE FORMING APPARATUS

BACKGROUND OF THE DISCLOSURE

Field of the Disclosure

The aspect of the embodiments relates to a scanning optical system, an optical scanning device, and an image forming apparatus that use an optical element having a transmittance distribution in a light scanning direction.

Description of the Related Art

Conventionally, a scanning optical system such as a laser beam printer (LBP) periodically deflects, using an optical deflector, a light beam emitted from a light source that is optically modulated according to an image signal, focuses the light beam in a spot manner on a recording medium surface using an image forming optical system, and scans the recording medium to record an image.

FIG. 8 illustrates a cross-sectional view of main part in a main-scanning direction (main-scanning cross-sectional view) of a conventional scanning optical system. In FIG. 8, a scanning optical system 80 includes a light source 81, and the light source 81 includes, for example, a semiconductor laser. Light emitted from the light source 81 passes through a collimator lens 82 and is converted into a substantially parallel light beam, and an aperture stop 83 limits light beam that passes therethrough to shape a beam form. An optical deflector 84 includes, for example, a four-sided polygon mirror (rotary polygon mirror), and rotates at a constant speed in a direction of arrow A in FIG. 8 by a driving unit (not illustrated) such as a motor and deflects light.

The light beam based on image information, that has been reflected and deflected by the optical deflector 84 is focused on a photosensitive drum surface 88 as a surface to be scanned by a first scanning lens 86 and a second scanning lens 87, which constitute a scanning optical lens system 85 having a light-condensing function and an fθ characteristic.

Such a conventional scanning optical system has an issue of occurrence of light quantity unevenness where the light quantity in the main-scanning direction on the surface to be scanned by the light beam becomes uneven due to reflection characteristics of a reflection surface of the rotary polygonal mirror. The light quantity unevenness causes deterioration of quality of an image recorded on the recording medium surface of the LBP.

Japanese Patent Application Laid-Open No. 2011-154115 discusses, to resolve the issue, a scanning optical system that uniformizes a light quantity on a surface to be scanned by including a light quantity correction optical film having a transmittance distribution in a main-scanning direction on an optical path of the scanning optical system. Specifically, Japanese Patent Application Laid-Open No. 2011-154115 discusses the light quantity correction optical film obtained by forming a film of a light shielding material on a light transmitting member by a deposition method.

SUMMARY OF THE DISCLOSURE

The aspect of the embodiments relates to a system including a light source, a deflection unit configured to deflect a light beam having a wavelength λ emitted from the light source, and a plurality of lenses that focuses deflected light on a surface to be scanned, in which at least one lens among the plurality of lenses has a micro concavo-convex structure in a surface, and a lens surface having the micro concavo-convex structure in the surface has a larger transmittance at a lens center than a transmittance at a lens end portion for the light beam having the wavelength λ.

Further, the aspect of the embodiments relates to an apparatus including a scanning device including the above-described system, a photosensitive drum disposed on a surface to be scanned of the optical scanning device, a developing unit configured to develop, as a toner image, an electrostatic latent image formed by a light beam scanning the photosensitive drum, a transfer unit configured to transfer the developed toner image on a sheet, and a fixing unit configured to fix the transferred toner image on the sheet.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the drawings.
(Scanning Optical System)

Figure 1:
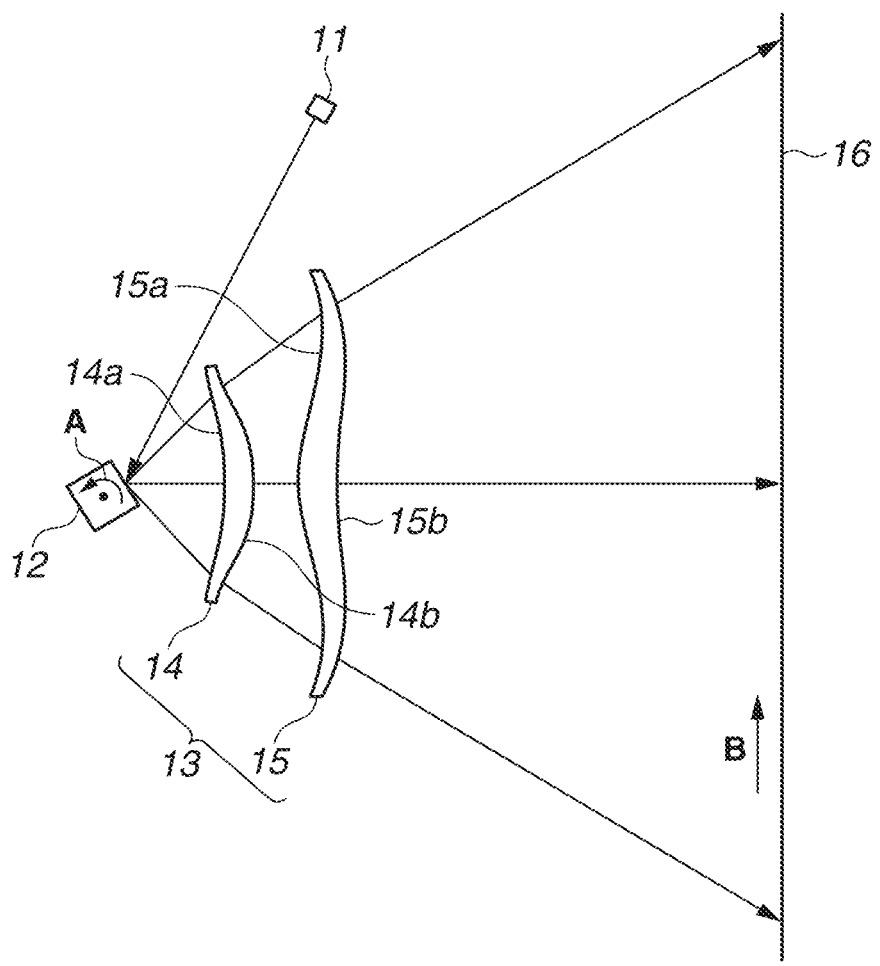
FIG. 1 is a cross-sectional view in a main-scanning direction of a scanning optical system according to the present exemplary embodiment.

FIG. 1 is a cross-sectional view in a main-scanning direction of a scanning optical system according to the present exemplary embodiment. In FIG. 1, a scanning optical system 10 includes a light source 11, and, for example, a semiconductor laser can be used as the light source 11. Light (wavelength λ) emitted from the light source 11 is deflected by an optical deflector (deflection unit) 12. In the present specification, a direction in which a light beam is deflected by the optical deflector 12 is defined as the main-scanning direction. The optical deflector 12 includes, for example, a four-sided polygon mirror, and rotates at a constant speed in a direction of arrow A in FIG. 1 using a driving unit (not illustrated) such as a motor.

A scanning lens system 13 as a scanning optical unit having a light-condensing function and fθ characteristics is a lens unit including a plurality of lenses made of a resin material. In FIG. 1, the scanning lens system 13 includes a first scanning lens 14 and a second scanning lens 15. The first scanning lens 14 has an optical surface 14a on the optical deflector 12 side and an optical surface 14b opposite the optical surface 14a. Similarly, the second scanning lens 15 has an optical surface 15a on the optical deflector 12 side and an optical surface 15b opposite the optical surface 15a. The scanning optical system 10 according to the present exemplary embodiment has a micro concavo-convex structure in an optical surface of at least one of the first scanning lens 14 and the second scanning lens 15. The scanning optical system 10 according to the exemplary embodiment favorably has the micro concavo-convex structure in at least two or more optical surfaces of a plurality of lenses. Here, the optical surface refers to a surface that the light beam is assumed to pass through when the lens is designed.

In the scanning optical system 10, in one embodiment, that the first scanning lens 14 and/or the second scanning lens 15 has the micro concavo-convex structure in both optical surfaces that are opposite each other. Further, it is more favorable that the first scanning lens 14 and the second scanning lens 15 have the micro concavo-convex structure in the both optical surfaces 14a and 14b and 15a and 15b, which are opposite each other.

It is favorable that the first scanning lens 14 has the micro concavo-convex structure in the two optical surfaces 14a and 14b and the second scanning lens 15 has the micro concavo-convex structure in the two optical surfaces 15a and 15b.

The light beam reflected and deflected by the optical deflector 12 passes through the scanning lens system 13 and focuses an image on a surface to be scanned 16.

Figure 2:
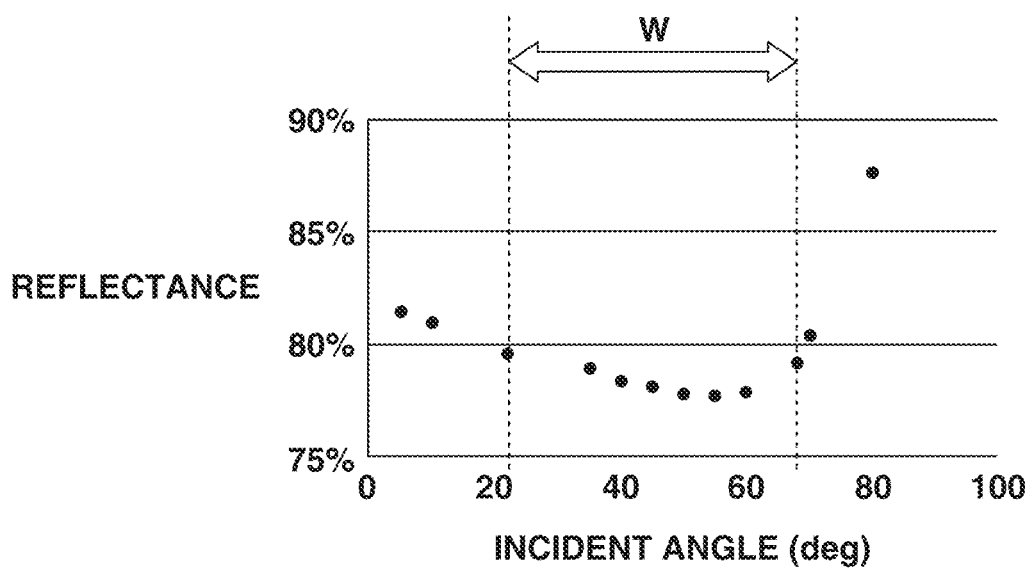
FIG. 2 is a diagram illustrating incident light dependency of a light beam reflectance in an optical deflector.

FIG. 2 illustrates an example of incident light dependency of a light beam reflectance in the optical deflector 12. Here, an incident angle θ is an angle formed by an incident direction of the light beam incident on a reflection surface of the optical deflector and a normal line to the reflection surface. For example, in a case where a range of the incident angle θ to be used is 22° to 68°, the light quantity of the reflected and deflected light beam has a distribution of approximately 1.9% in the main-scanning direction.

Each lens surface of the first scanning lens 14 and the second scanning lens 15 in the present exemplary embodiment has a spherical or aspherical shape in the main-scanning cross-section as illustrated in FIG. 1. The optical system according to the exemplary embodiment has the micro concavo-convex structure in at least one surface of the first scanning lens 14 or the second scanning lens 15. The micro concavo-convex structure formed in the scanning lens controls the reflectance (transmittance) of the light beam reflected and deflected by the optical deflector 12 to uniformize the light quantity on the surface to be scanned 16.

Figure 3A:
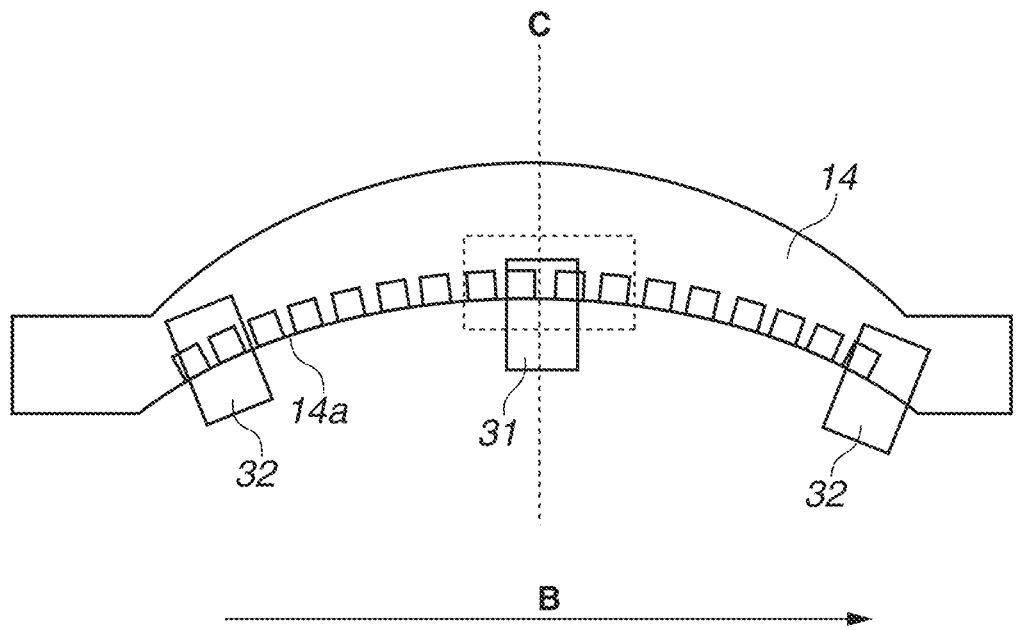
FIG. 3A is a schematic view of a lens and FIG. 3B is a schematic view of a micro concavo-convex structure according to the present exemplary embodiment.

FIG. 3A illustrates an example of the scanning lens according to the present exemplary embodiment. In FIG. 3A, the micro concavo-convex structure is provided in one surface 14a of the first scanning lens 14. In FIG. 3A, the first scanning lens 14 has a lens center 31 in a center C of an optically effective region and a lens end portion 32 in an end in the optically effective region in a direction B in which a scan is performed using light (hereinafter the direction B is called scanning direction). Here, the lens center 31 refers to a region with a width of 1 cm including the center C (the center in the scanning direction of the lens) and the lens end portion 32 refers to a region with a width of 1 cm from the end of the optically effective region.

The first scanning lens 14 of the present exemplary embodiment has the transmittance distribution for the light beam having the wavelength λ such that variation in the light quantity of scanning light after passing through the scanning lens system 13 becomes small.

For example, a case of performing a scan with the light beam in a range W of the incident angle θ of 22° to 68° using the optical deflector 12 illustrated in FIG. 2 will be described. As can be seen from FIG. 2, the light beam having the incident angle of approximately 45° for entering the lens center 31 has a lower reflectance at the optical deflector 12 and thus has a smaller light quantity than the light beams having the incident angles of approximately 22° and 68° for entering the lens end portion 32. Therefore, the micro concavo-convex structure is provided in the surface 14a such that the transmittance of the first scanning lens 14 with respect to the light having the wavelength λ becomes larger at the lens center 31 than at the lens end portion 32. Thereby, the light quantity of the light beam in the range of the incident angle θ of 22° to 68° after passing through the scanning lens system 13 can be uniform. That is, the transmittance of the scanning lens system 13 has a distribution according to a light quantity distribution of the light deflected by the optical deflector 12 and entering the scanning lens system 13. Hereinafter, the micro concavo-convex structure may be simply described as microstructure.

Figure 9:
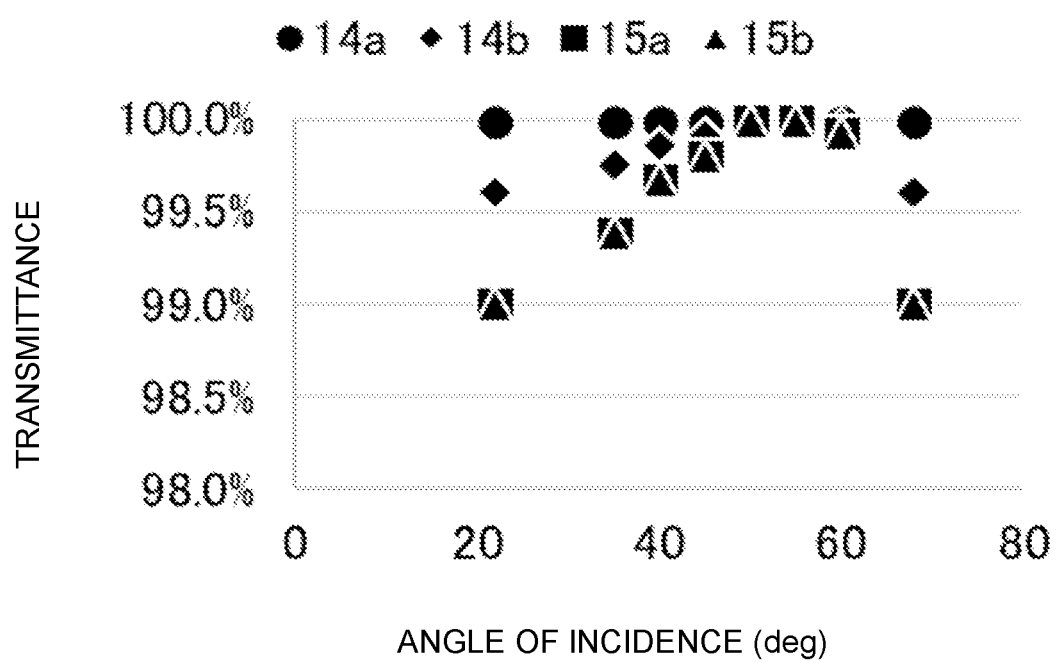
FIG. 9 illustrating correlations of a transmittance distribution.
Figure 10:
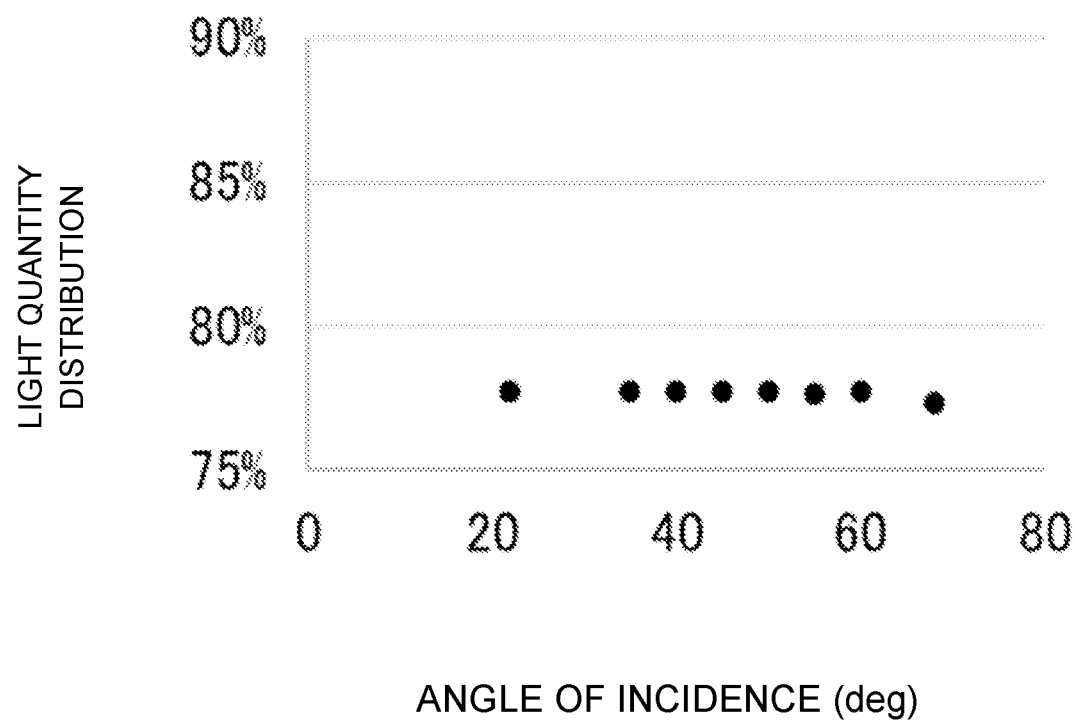
FIG. 10 illustrating a light quantity distribution versus angle of incidence, and sentences for explanation of these drawings.

As a specific example, FIG. 9 illustrates a relationship between the angle of incidence of the light beam having the wavelength λ and transmittance for the light beam having the wavelength λ of each of the optical surfaces 14a, 14b of the lens 14 and the optical surfaces 15a, 15b of the lens 15 included in the lens unit, and FIG. 10 illustrates the light quantity distribution of the light beam having the wavelength λ after the light beam having the wavelength λ and deflected by the optical deflector 12 passes through the lens unit constituted of the lenses 14 and 15 shown in FIG. 9.

In the first scanning lens 14, the transmittance of the light beam having the wavelength λ favorably monotonically decreases from the lens center 31 toward the lens end portion 32.

Figure 3B:
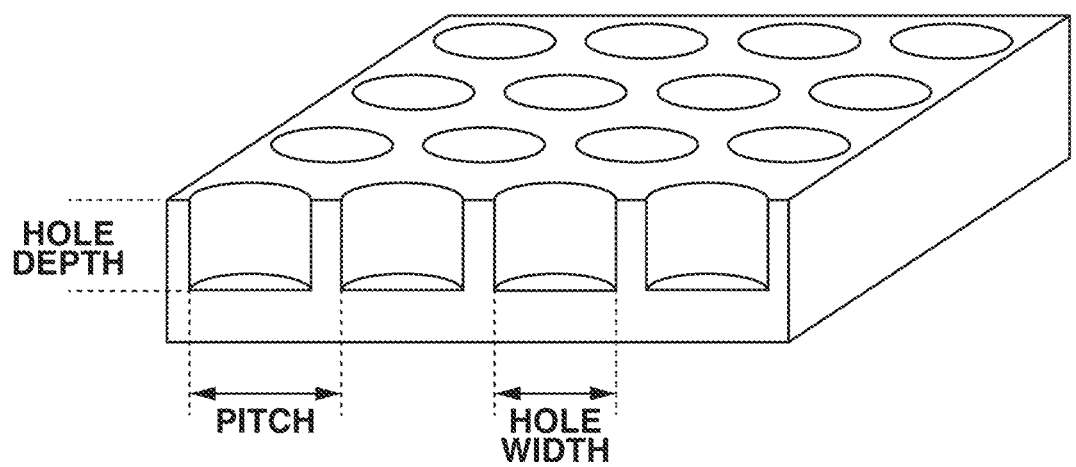

FIG. 3B is a schematic view of the micro concavo-convex structure, (vertically inverting and) enlarging a region illustrated by the broken line in FIG. 3A. In the case of the scanning lens 14 illustrated in FIG. 3, the transmittance is controlled by the microstructure including triangularly arrayed cylindrical holes, so that the light quantity in the main-scanning direction is adjusted and the light quantity on the surface to be scanned 16 is uniformized. The micro concavo-convex structure is not limited to the cylindrical hole, and may be a conical hole, a prismatic hole, or a pyramidal hole. Further, the micro concavo-convex structure may be a structure having micro protrusions of cylinders, cones, prisms, or pyramids, or instead, a line-and-space pattern or the like can be used. Note that the microstructure can have any pitch as long as no diffraction occurs under use conditions. However, if the pitch is too small, production becomes difficult. Therefore, in practice, the pitch is favorably 100 nm to 900 nm, both inclusive, and is more favorably 300 nm to 500 nm, both inclusive. A hole depth is favorably 100 nm to 220 nm, both inclusive, more favorably 110 nm to 210 nm, both inclusive, and further more favorably 125 nm to 195 nm, both inclusive.

In the case of the columnar hole structure as illustrated in FIG. 3, the microstructure can be expressed in terms of a hole pitch P, a hole depth D, and a porosity V. The porosity V corresponds to the cubic content of holes per unit cubic content. In the pitch range where diffracted light is not generated, the transmittance can be controlled by adjusting one or both of the hole depth D and the porosity V.

First, the pitch P will be described. To prevent diffraction in the air, the following expression (1) is to be satisfied, where λ is the wavelength of the light beam, $N_0[\lambda]$ is a refractive index of air at the wavelength of the light beam, and $N_1[\lambda]$ is a refractive index of the scanning lens at the wavelength of the light beam.

$$P<\lambda/(N_0[\lambda]+N_0[\lambda]\times\sin\alpha) \quad (1)$$

Next, to prevent diffraction inside the scanning lens, the following expression (2) is to be satisfied.

$$P<\lambda/(N_1[\lambda]+N_1[\lambda]\times\sin\alpha) \quad (2)$$

Next, the hole depth D and the porosity V will be described. λ is the wavelength of the light beam, N [λ] is an equivalent refractive index of the microstructure at the wavelength of light beam, $N_0[\lambda]$ is a refractive index of air at the wavelength of the light beam, and $N_1[\lambda]$ is a refractive index of the scanning lens at the wavelength of the light beam. The equivalent refractive index N of the micro concavo-convex structure can be obtained by the following expression (3) using the porosity V.

$$N[\lambda]=N_0[\lambda]\times V+N_1[\lambda]\times(1-V) \quad (3)$$

The microstructure can be treated as a single layer film having a film thickness of the hole depth D and the refractive index N [λ] as long as the pitch P is set in the range where no diffracted light occurs. Therefore, the refractive index of the scanning lens, that is, the transmittance can be designed by performing general optical calculation using the hole depth D and the porosity V.

Figure 4A:
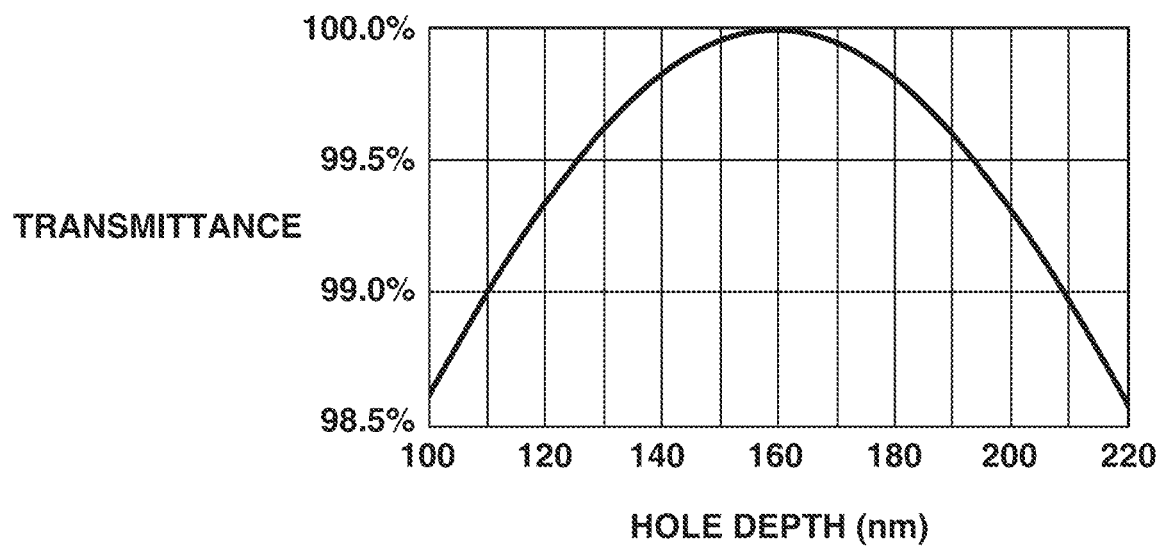
FIGS. 4A and 4B are graphs illustrating correlations between dimensions of the micro concavo-convex structure and transmittance.
Figure 4B:
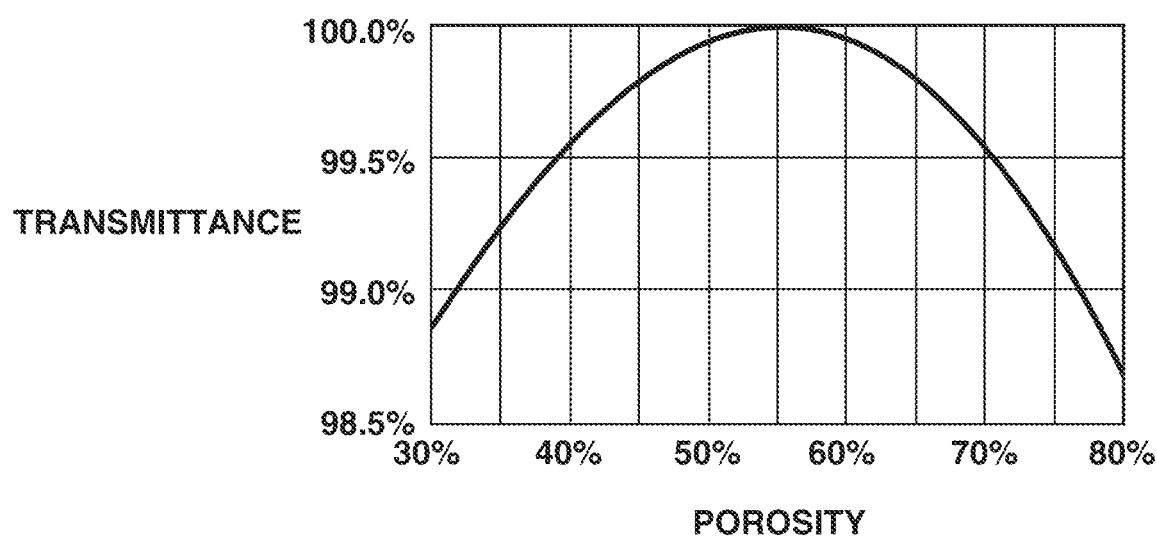

FIGS. 4A and 4B are examples of graphs illustrating correlations between dimensions of the microstructure illustrated in FIG. 3 and transmittance. Here, the pitch P is set in the range where diffracted light does not occur, and the wavelength of the light beam was 790 nm, which is generally used as light source unit. FIG. 4A is a correlation graph of the hole depth D and the transmittance at the porosity V of 55%. Further, FIG. 4B is a correlation graph of the porosity V and the transmittance at the depth D of 160 nm. As can be seen from these graphs, the transmittance of the scanning lens can be controlled using the hole depth (the difference in heights of a top of a convex and a bottom of a concave) D and the porosity V.

By providing the dimensional distribution of the microstructure in the main-scanning direction of the scanning lens system, the transmittance distribution according to the light quantity of the light beam deflected by the optical deflector and entering the scanning lens system 13 is configured, and the light quantity on the surface to be scanned 16 can be uniformized.

While the micro concavo-convex structure has the role of adjusting the transmittance of the scanning lens system 13, the micro concavo-convex structure also has an effect of preventing light reflection occurring on the surface of the surface 14a at the same time. As a result, stray light caused by reflection on the surface of the surface 14a can be reduced, and occurrence of uneven light quantity due to the stray light can be suppressed. An example of providing the micro concavo-convex structure in one surface 14a of the first scanning lens 14 has been described. However, the micro concavo-convex structure may be provided in at least one of the surfaces 14a and 14b of the first scanning lens 14 and the surfaces 15a and 15b of the second scanning lens 15 through which the light beam passes. Moreover, the micro concavo-convex structure may be provided in arbitrary two or three or all of the surfaces 14a, 14b, 15a, and 15b. The dimensional distribution of the microstructure per surface can be made smaller as the number of surfaces where the micro concavo-convex structure is formed is larger.

(Electrophotographic Device)

Figure 5:
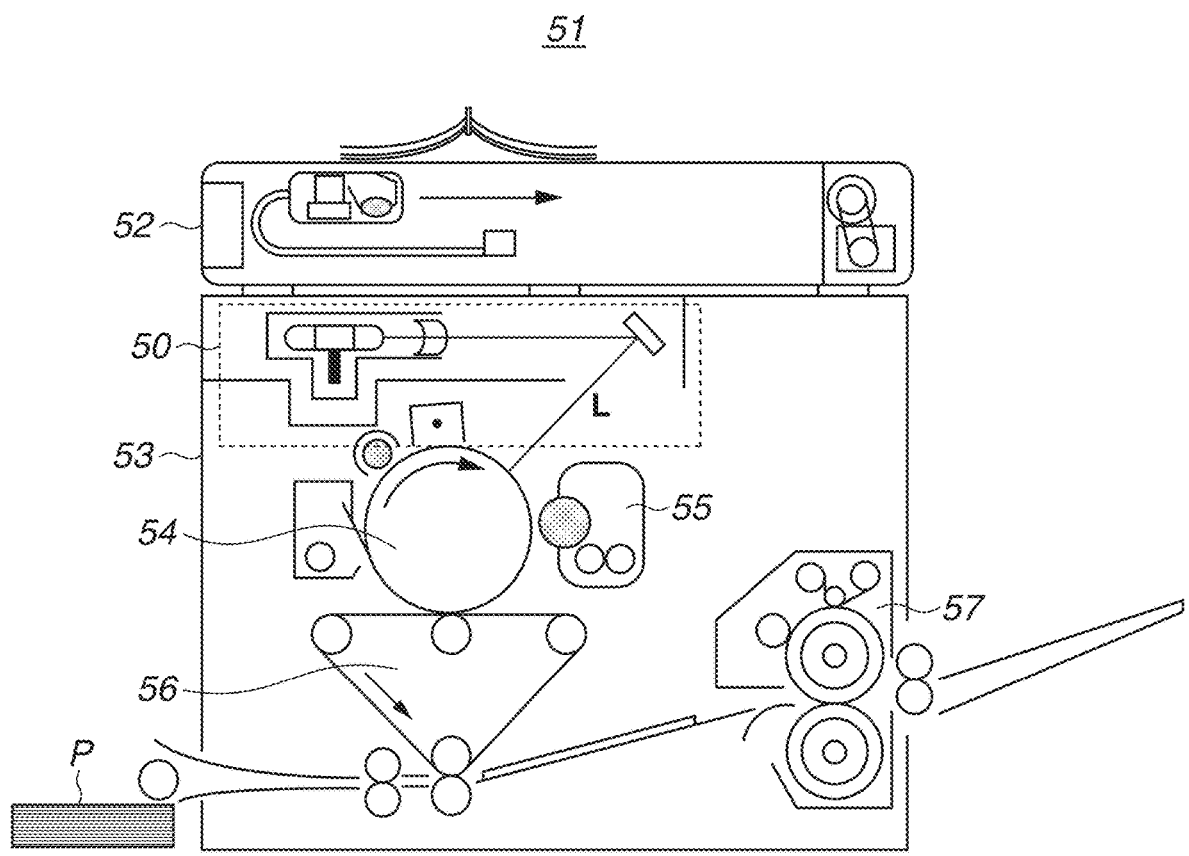
FIG. 5 is a schematic view of an image forming apparatus according to the present exemplary embodiment.

An image forming apparatus using the scanning optical system according to the aspect of the embodiments as a laser optical system of a copier or a multifunction machine will be described. FIG. 5 is a schematic view of a copier. A copier 51 includes an image reading unit 52 and an image forming unit 53. The image forming unit 53 includes a laser optical system 50.

The image forming unit 53 further includes a photosensitive drum 54 disposed on a surface to be scanned of a laser optical system 50, and a developing unit 55 that develops, as a toner image, an electrostatic latent image formed on the photosensitive drum by scanning the photosensitive drum with a light beam. The image forming unit 53 includes a transfer unit 56 that transfers the developed toner image on a sheet P, and a fixing unit 57 that fixes the transferred toner image on the sheet.

By using the laser optical system according to the aspect of the embodiments for the laser optical system 50, the light quantity used to scan the photosensitive drum can be uniformized and an image with high image quality can be formed. Further, as described above, the micro concavo-convex structure has the effect of adjusting the transmittance of the scanning lens system 13 and preventing reflection at the same time. Therefore, the stray light caused by the reflection on the surface can be reduced. Therefore, the uneven light quantity (so-called ghost) caused by the stray light can be suppressed, and an image with higher image quality can be realized.

(Method of Manufacturing Scanning Lens)

A method of forming the microstructure in the scanning lens of the present exemplary embodiment will be described with reference to FIGS. 6A to 6G.

Figure 6A:
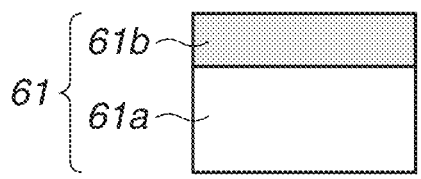
FIGS. 6A to 6G are cross-sectional views of a process of manufacturing the micro concavo-convex structure according to the present exemplary embodiment.

As illustrated in FIG. 6A, an injection molding mold 61 for molding the scanning lens is prepared. The injection molding mold 61 includes a stainless steel base 61a and a nickel alloy mirror surface 61b.

Figure 6B:
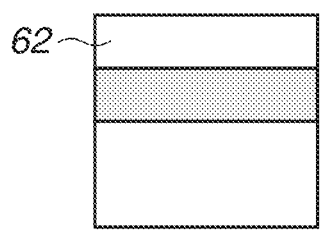

As illustrated in FIG. 6B, a photoresist layer 62 is formed by spin coating. Spin coating can be performed at 500 rpm to 4000 rpm, both inclusive, for 10 seconds to 60 seconds, both inclusive. The film thickness of the photoresist layer is favorably 100 nm to 10000 nm, both inclusive, and more favorably 100 nm to 500 nm, both inclusive.

Figure 6C:
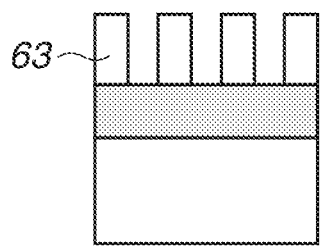

As illustrated in FIG. 6C, the photoresist layer 62 is exposed by an interference exposure method and is then developed, so that a photoresist pattern 63 can be obtained. The interference exposure can be performed with laser light having a wavelength of 254 to 365 nm, both inclusive, for an exposure time of 0.1 to 10 seconds, both inclusive.

Figure 6D:
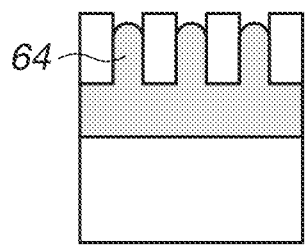

As illustrated in FIG. 6D, a nickel alloy pattern 64 is grown in a recess in the photoresist pattern 63 by a plating method.

Figure 6E:
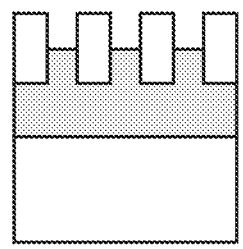

As illustrated in FIG. 6E, the height of the nickel alloy pattern 64 is adjusted by an ion milling method using Ar ions. The milling time of each area is controlled so as to monotonically increase the height from the center 31 to the end portion 32.

Figure 6F:
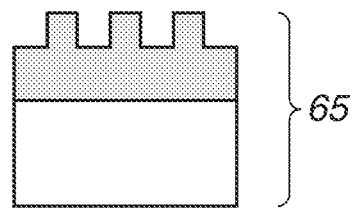

As illustrated in FIG. 6F, the photoresist pattern 63 is removed by ultrasonic cleaning using a peeling liquid, and a microstructure mold 65 having an inverted structure of the microstructure formed in the scanning lens surface is obtained.

Figure 6G:
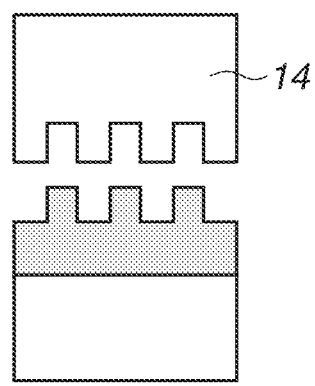

Next, as illustrated in FIG. 6G, by performing injection molding using the microstructure mold 65, the microstructure can be transferred to the surface at the same time with formation of the scanning lens. The scanning lenses 14 and 15 having the microstructure in the surfaces are obtained in this manner.

Note that a surface where the microstructure is not formed is formed using a mold having a nickel alloy mirror surface on a stainless base.

The following exemplary embodiments and comparative examples were evaluated by the following method.

(Method of Measuring Transmittance)

The transmittance was measured using a spectroscope device (V-7300DS, manufactured by JASCO Corporation). Since transmitted light is refracted by a lens to be measured, evaluation was conducted using an integrating sphere. The transmittances at the lens center 31 and the lens end portion 32 were evaluated in arbitrary φ1-mm regions included in the respective regions.

(Method of Measuring Reflectance)

The reflectance was measured using a micro-spectroscope (LVmicro, manufactured by Lambda Vision Inc.). The measurement wavelength was 380 nm to 1600 nm, and evaluation was performed using the reflectance value of 790 nm. The reflectances at the lens center 31 and the lens end portion 32 were evaluated in arbitrary φ1-mm regions included in the respective regions.

(Evaluation of Light Quantity Distribution on Surface to be Scanned)

The light quantity distribution was measured by arranging members similarly to the scanning optical system designed for laser beam printer (LBP) products and installing a light quantity sensor at the position of the surface to be scanned.

In a first exemplary embodiment, the micro concavo-convex structure and the transmittance distribution were provided in the optical surface 14a on the optical deflector 12 side of the first scanning lens 14 in the scanning optical system in FIG. 1. The optical deflector 12 has the incident light dependency illustrated in FIG. 2, and the range of the incident angle θ to be used is 22° to 68°. Note that the other surface is a mirror surface and is not provided with the transmittance distribution.

First, the microstructure was provided in the optical surface of the first scanning lens 14 by the following method.

The method of forming the microstructure in the first exemplary embodiment of the disclosure will be described with reference to FIGS. 6A to 6G. FIGS. 6A to 6G are cross-sectional views of a process of the first exemplary embodiment.

First, as illustrated in FIG. 6A, the injection molding mold 61 for molding the scanning lens was prepared. The injection molding mold 61 including the stainless steel base 61a and the nickel alloy mirror surface 61b was used.

As illustrated in FIG. 6B, the photoresist layer 62 was formed by the spin coating. Spin coating conditions were 1000 rpm/20 seconds, and the film thickness of the photoresist layer 62 was approximately 350 nm.

Next, as illustrated in FIG. 6C, the photoresist layer 62 was exposed by the interference exposure method and was then developed, so that the photoresist pattern 63 was obtained. In the first exemplary embodiment, a hole pattern having a triangular lattice array was formed with a cycle of 400 nm. Further, the diameter of the hole was approximately 312 nm, and the depth was approximately 350 nm, which is equivalent to the film thickness of the photoresist layer 62.

Next, as illustrated in FIG. 6D, the nickel alloy pattern 64 was grown in the recess in the photoresist pattern 63 by the plating method. The plating time was adjusted such that the height of the nickel alloy pattern 64 became approximately 310 nm.

Next, the ion milling method using Ar ions was performed in an area unit of several 100 μm to adjust the height of the nickel alloy pattern 64 as illustrated in FIG. 6E. In the first exemplary embodiment, the milling time was adjusted to set the height of the center 31 to approximately 160 nm and the height of the end portion 32 to approximately 243 nm. Further, the milling time of each area was controlled so as to monotonically increase the height from the center 31 to the end portion 32 according to the incident light dependency of the optical deflector 12 for the light to be used.

Next, as illustrated in FIG. 6F, the photoresist pattern 63 was removed by the ultrasonic cleaning using a peeling liquid. At this time, the nickel alloy adhering to a sidewall of the photoresist pattern 63 during the ion milling was also removed. After the ultrasonic cleaning, the surface of the nickel alloy pattern 64 was cleaned by electrolytic cleaning, and the microstructure mold 65 having an inverted structure of the microstructure formed in the scanning lens surface was obtained.

Next, as illustrated in FIG. 6G, the injection molding was performed using the microstructure mold 65 and the mold including a stainless base and a nickel alloy mirror surface and having no microstructure, so that the microstructure was transferred to the surface at the same time with formation of the scanning lens. The scanning lens 14 having the microstructure in the surface was obtained in this manner. Regarding the microstructure in the surface of the scanning lens 14 obtained in the first exemplary embodiment, three portions of the center 31, end portion 32, and an intermediate portion between the center 31 and the end portion 32 were observed using an electron microscope. As a result, a substantially inverted structure of the microstructure of the microstructure mold 65 was obtained.

The second scanning lens 15 was obtained by injection molding using an ordinary injection molding mold.

The scanning lens system 13 was configured using the produced scanning lenses 14 and 15, and the optical system illustrated in FIG. 1 was produced similarly to the scanning optical system for LBP products and evaluated. The evaluation results are illustrated in Table 1.

A second exemplary embodiment was similar to the first exemplary embodiment except that a micro concavo-convex shape was formed in the optical surfaces 14a and 14b of the first scanning lens 14 and in the optical surfaces 15a and 15b of the second scanning lens, and the transmittance distribution was formed in the optical surface 15b. The transmittance distribution of the optical surface 15b in the second exemplary embodiment was made equal to the transmittance distribution of the optical surface 14a in the first exemplary embodiment.

In the second exemplary embodiment, the first scanning lens 14 was produced similarly to the first exemplary embodiment except for the following steps.

Steps in FIGS. 6A to 6C were performed similarly to the first exemplary embodiment.

Next, in forming the nickel alloy pattern 64 by the plating method in FIG. 6D, the plating time was adjusted such that the height becomes approximately 200 nm.

Next, in adjusting the height of the nickel alloy pattern 64 by the ion milling method using Ar ions in FIG. 6E, the milling time of each area was controlled such that the height of the center 31 becomes approximately 181 nm, the height of the end portion 32 becomes approximately 76 nm, and the height is monotonically lowered from the center 31 to the end portion 32.

In FIGS. 6F and 6G, the scanning lens 14 having the microstructure in the surface was obtained, similarly to the first exemplary embodiment.

The evaluation results of the optical system of the second exemplary embodiment are illustrated in Table 1.

A third exemplary embodiment was similar to the second exemplary embodiment except that the transmittance distribution was formed in the two optical surfaces 15a and 15b of the second scanning lens 15.

In the third exemplary embodiment, the scanning optical lens 15 was produced similarly to the first exemplary embodiment except for the following steps.

A method of forming the microstructure in the third exemplary embodiment will be described with reference to FIGS. 7A to 7G. Note that FIGS. 7A to 7G illustrate one surface in the process of forming the microstructure.

Figure 7A:
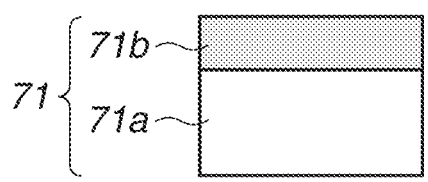
FIGS. 7A to 7G are cross-sectional views of a process of manufacturing a micro concavo-convex structure according to a third exemplary embodiment.

As illustrated in FIG. 7A, an injection molding mold 71 for molding a scanning lens is prepared. The injection molding mold 71 including a stainless steel base 71a and a nickel alloy mirror surface 71b is used.

Figure 7B:
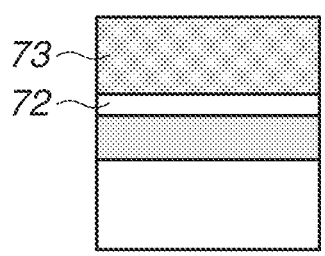

As illustrated in FIG. 7B, a titanium film 72 and a silicon dioxide film 73 are formed by a sputtering method. In the third exemplary embodiment, the titanium film 72 had the film thickness of approximately 50 nm, and the silicon dioxide film 73 had the thickness of approximately 200 nm.

Figure 7C:
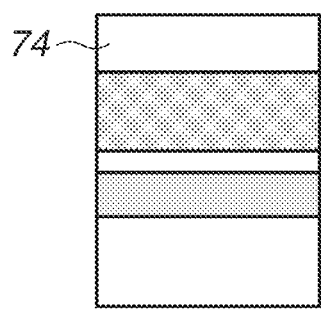

As illustrated in FIG. 7C, a photoresist layer 74 was formed by a spin coating method. Spin coating conditions in the third exemplary embodiment were 3000 rpm/20 seconds, and the film thickness of the photoresist layer 74 was approximately 150 nm.

Figure 7D:
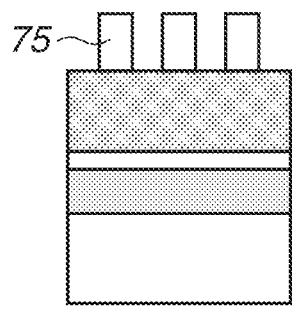

Next, as illustrated in FIG. 7D, the photoresist layer 74 was exposed by an electron beam (EB) drawing method and was then developed, so that a photoresist pattern 75 was obtained. In the third exemplary embodiment, a pillar pattern having a triangular lattice array was formed with a cycle of 450 nm. Further, a pillar diameter was set to approximately 350 nm at a center and approximately 401 nm at an end portion, and the pillar pattern was drawn such that the diameter is monotonically widened from the center toward the end portion. The height was approximately 150 nm, which is equivalent to the film thickness of the photoresist layer 74.

Figure 7E:
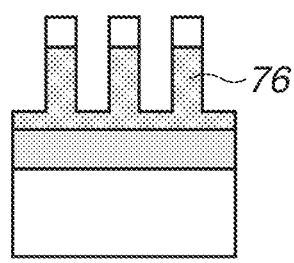

Next, as illustrated in FIG. 7E, the silicon dioxide film 73 exposed in a recess of the photoresist pattern 75 was dry-etched by a dry etching method using CHF3 gas, and a silicon dioxide pattern 76 was obtained. In the third exemplary embodiment, an etching time was controlled such that the height of the silicon dioxide pattern 76 becomes approximately 160 nm.

Figure 7F:
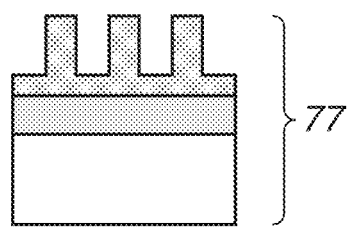

Next, as illustrated in FIG. 7F, the photoresist pattern 75 was removed by an oxygen ashing method. Thereafter, a monomolecular release film (not illustrated) was formed on a surface of the silicon dioxide pattern 76, so that a microstructure mold 77 was obtained.

Figure 7G:
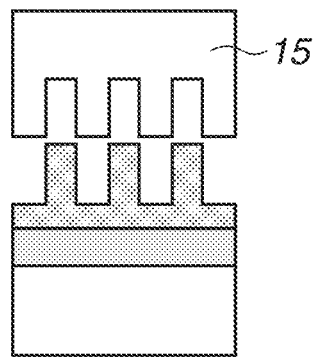
Figure 8:
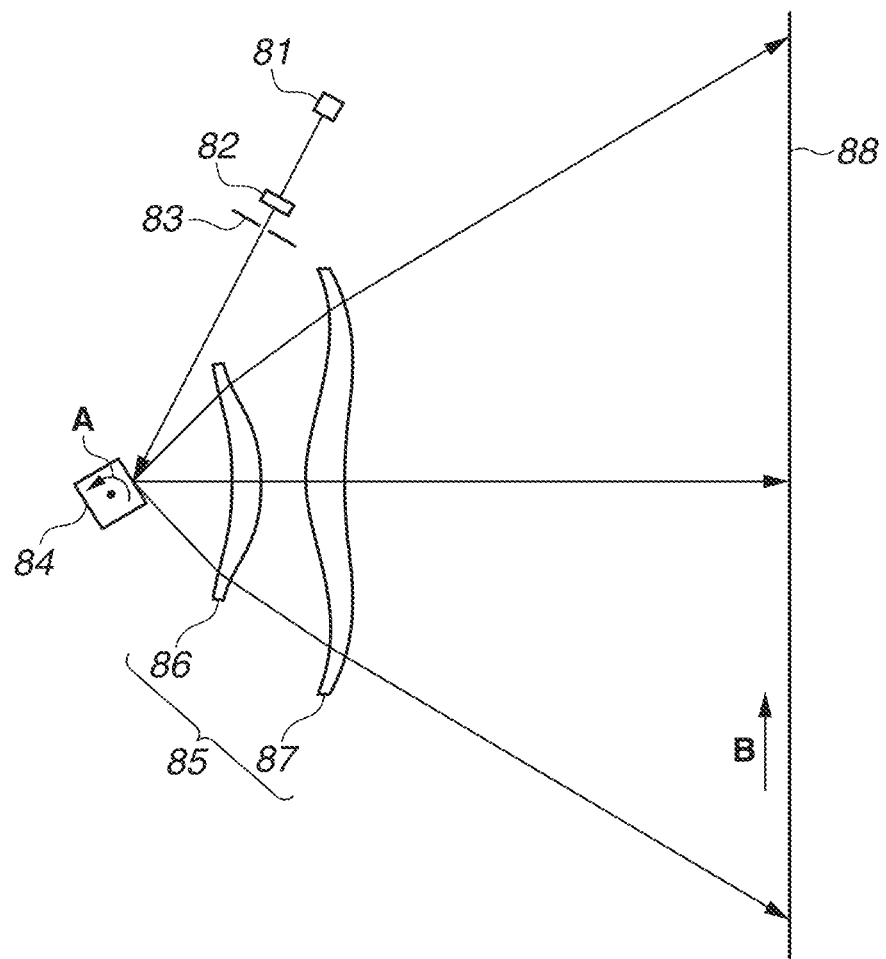
FIG. 8 is a cross-sectional view in a main-scanning direction of a scanning optical system according to a conventional technology.

Next, injection molding was conducted using a microstructure having unevenness according to the microstructure to be formed in the other surface of the scanning lens 15, which was produced by a similar method to the microstructure mold 77, and the microstructure mold 77. By such a method, the microstructure was transferred to the surface at the same time with formation of the scanning lens, as illustrated in FIG. 7G. The second scanning lens 15 having the microstructure in both the surfaces was obtained in this manner Regarding the microstructure in the surfaces of the second scanning lens 15 obtained in the third exemplary embodiment, three portions of the center, end portion, and an intermediate portion between the center and the end portion were observed using an electron microscope. As a result, a substantially inverted structure of the microstructure of the microstructure mold 77 was obtained.

A fourth exemplary embodiment was similar to the first exemplary embodiment except that the transmittance distribution was formed in three surfaces of the optical surface 14b of the first scanning lens 14 and the optical surfaces 15a and 15b of the second scanning lens 15. The transmittance was monotonically changed between the center and the end portion in each of the optical surfaces 14b, 15a, and 15b.

In the fourth exemplary embodiment, the first scanning lens 14 and the second scanning lens 15 were produced similarly to the third exemplary embodiment except for the following steps.

Steps in FIGS. 7A to 7C were performed similarly to the third exemplary embodiment.

Next, in forming a photoresist pattern 75 by an EB drawing method illustrated in FIG. 7D, a pillar pattern having a triangular lattice array was formed with a cycle of 300 nm using a mold for 15b surface. The pillar diameter was set to approximately 234 nm at a center and approximately 202 nm at an end portion, and the pillar pattern was drawn such that the diameter is monotonically narrowed from the center toward the end portion. A pillar pattern having a triangular lattice array was formed with a cycle of 200 nm using a mold having an inverted structure of the optical surface 15a and the optical surface 15b. The pillar diameter was set to approximately 156 nm at the center and approximately 119 nm at the end portion, and the pillar pattern was drawn such that the diameter is monotonically narrowed from the center toward the end portion. The depth was approximately 150 nm, which is equivalent to the film thickness of the photoresist layer 74.

Next, the scanning lenses 14 and 15 having the microstructure in the surfaces were obtained similarly to the third exemplary embodiment in the steps illustrated in FIGS. 6E to 6G.

A fifth exemplary embodiment was similar to the fourth exemplary embodiment except for forming the transmittance distribution in the four optical surfaces 14a, 14b, 15a, and 15b. Regarding the transmittance distribution, the transmittance at the center was 99.99% and the transmittance at the end portion was 99.40%, and the transmittance between the center and the end portion was monotonically changed.

In the fifth exemplary embodiment, the first scanning lens 14 was produced similarly to the first exemplary embodiment except for the following steps.

Steps in FIGS. 6A to 6C were performed similarly to the first exemplary embodiment.

Next, in forming the nickel alloy pattern 64 by the plating method in FIG. 6D, the plating time was adjusted such that the height becomes approximately 200 nm.

Next, in adjusting the height of the nickel alloy pattern 64 by the ion milling method using Ar ions illustrated in FIG. 6E, the milling time of each area was controlled such that the height of the center becomes approximately 160 nm, the height of the end portion becomes approximately 122 nm, and the height is monotonically lowered from the center to the end portion.

In FIGS. 6F and 6G, the scanning lens 14 having the microstructure in a surface was obtained, similarly to the first exemplary embodiment.

TABLE 1

| | | | 14a | 14b | 15a | 15b | Transmittance change | Illuminance uniformity |
|---|---|---|---|---|---|---|---|---|
| First exemplary embodiment | Transmittance | Center | 99.99% | 96.00% | 96.00% | 96.00% | Monotonically changes | A |
| | | End portion | 97.60% | 96.00% | 96.00% | 96.00% | | |
| | Reflectance | Center | 0.01% | 4.00% | 4.00% | 4.00% | | |
| | | End portion | 2.40% | 4.00% | 4.00% | 4.00% | | |
| Second exemplary embodiment | Transmittance | Center | 99.99% | 99.99% | 99.90% | 99.99% | Monotonically changes | A |
| | | End portion | 99.99% | 99.99% | 99.90% | 97.60% | | |
| | Reflectance | Center | 0.01% | 0.01% | 0.10% | 0.01% | | |
| | | End portion | 0.01% | 0.01% | 0.10% | 2.40% | | |
| Third exemplary embodiment | Transmittance | Center | 99.99% | 99.99% | 99.99% | 99.99% | Monotonically changes | A |
| | | End portion | 99.99% | 99.99% | 98.80% | 98.80% | | |
| | Reflectance | Center | 0.01% | 0.01% | 0.01% | 0.01% | | |
| | | End portion | 0.01% | 0.01% | 1.20% | 1.20% | | |
| Fourth exemplary embodiment | Transmittance | Center | 99.99% | 99.99% | 99.99% | 99.99% | Monotonically changes | A |
| | | End portion | 99.99% | 99.60% | 99.00% | 99.00% | | |
| | Reflectance | Center | 0.01% | 0.01% | 0.01% | 0.01% | | |
| | | End portion | 0.01% | 0.40% | 1.00% | 1.00% | | |
| Fifth exemplary embodiment | Transmittance | Center | 99.99% | 99.99% | 99.99% | 99.99% | Monotonically changes | A |
| | | End portion | 99.40% | 99.40% | 99.40% | 99.40% | | |
| | Reflectance | Center | 0.01% | 0.01% | 0.01% | 0.01% | | |
| | | End portion | 0.60% | 0.60% | 0.60% | 0.60% | | |

(Evaluation)

In the first exemplary embodiment, the microstructure having the cylindrical hole was provided in the optical surface 14a of the first scanning lens 14. By forming the holes such that the depth of the holes increases from the center toward the end portion and the transmittance at the lens center was 99.99% and the transmittance at the lens end portion was 97.60%. As a result, the transmittance monotonically changed between the lens center and the lens end portion. The light quantity distribution on the surface to be scanned 16 was able to be uniformized Meanwhile, the reflectance at the center of the optical surface 14a of the first scanning lens 14 was 1% or less, but the reflectance of the other optical surfaces was higher than 1%.

Although stray light occurs due to reflection in a region where the reflectance exceeds 1%, the reflectance at the center of the optical surface 14a, which is most likely to reach the surface to be scanned 16, is 1% or less, so the sufficiently uniform light quantity distribution was able to be realized on the surface to be scanned 16.

In the second exemplary embodiment, the light quantity distribution on the surface to be scanned 16 was able to be uniformized. Moreover, the reflection on the optical surfaces 14a and 14b of the first scanning lens 14 and the optical surfaces 15a and 15b of the second scanning lens 15 of the scanning lens system was suppressed to increase the transmittance. Therefore, a loss of the light beam was able to be reduced. The reduction of the loss of the light beam leads to reduction of the cost of the light source or improves a scanning rate. The reflectance at the end portion of the optical surface 15b of the second scanning lens 15 was higher than 1% but the reflectance at the other optical surfaces was 1% or less. Therefore, it was confirmed that a sufficiently uniform light quantity distribution can be obtained on the surface to be scanned 16.

In the third exemplary embodiment, the light quantity distribution on the surface to be scanned 16 was able to be uniformized similarly to the second exemplary embodiment, and the transmittance of all the surfaces of the scanning lens system was increased. Therefore, the loss of the light beam was able to be reduced. Moreover, the transmittance distribution was provided using the two scanning lens surfaces. As a result, the transmittance distribution per surface was able to be reduced. The reflectance at the end portions of the optical surfaces 15a and 15b was able to be suppressed as compared with the reflectance at the end portion of the optical surface 15b of the second exemplary embodiment, but the reflectance was not able to be reduced to 1% or less. However, since the reflectance at the centers of all the optical surfaces was 1% or less, a sufficiently uniform light quantity distribution was able to be realized on the surface to be scanned 16.

In the fourth exemplary embodiment, the light quantity distribution on the surface to be scanned 16 was able to be uniformized similarly to the third exemplary embodiment, and the loss of the light beam was able to be reduced. Moreover, since the transmittance distribution was provided using three scanning lens surfaces, the transmittance distribution per surface was able to be reduced, the reflectance of all the optical surfaces was able to be 1% or less, the stray light was reduced as compared with the first to third exemplary embodiments, and a more uniform light quantity distribution was able to be obtained on the surface to be scanned 16.

The transmittance distribution of each of the optical surfaces 14a, 14b of the scanning lens 14 and the optical surfaces 15a, 15b of the scanning lens 15 produced in the fourth exemplary embodiment is illustrated in FIG. 9, and light quantity distribution of the light beam having the wavelength λ after passing through the lens unit is illustrated in FIG. 10.

In the fifth exemplary embodiment, the light quantity distribution on the surface to be scanned 16 was able to be uniformized similarly to the fourth exemplary embodiment, and the loss of the light beam was able to be reduced. Further, the reflectance of all the optical surfaces was able to be reduced to 1% or less. Similarly to the fourth exemplary embodiment, the stray light was reduced, and the uniform light quantity distribution was able to be obtained on the surface to be scanned 16.

From the results of the first to fifth exemplary embodiments, the difference in the transmittance between the lens center and the lens end portion was able to be made less than 1.9%. Further, regarding the first scanning lens 14 and the second scanning lens 15, the reflectance from the center to the end portion was set to 1.0% or less, whereby a more uniform light quantity distribution was able to be obtained on the surface to be scanned 16 than that of other exemplary embodiments.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-187964, filed Oct. 11, 2019, and No. 2020-153004, filed Sep. 11, 2020, which are hereby incorporated by reference herein in their entirety.

What is claimed is:

1. A system comprising:
a light source;
a deflection unit configured to deflect a light beam having a wavelength λ emitted from the light source; and
a lens unit on which the deflected light beam having the wavelength λ is incident and which includes a lens configured to focus the incident light beam having the wavelength λ on a surface to be scanned,
wherein the lens, by having a micro concavo-convex structure in an optical surface, has a transmittance distribution for a light beam having the wavelength λ according to a light quantity distribution of the deflected light beam having the wavelength λ and incident on the lens unit.

2. The system according to claim 1, wherein the light beam having passed through the lens unit has a smaller optical distribution than the light beam before passing through the lens unit.

3. The system according to claim 1, wherein the lens has a larger transmittance at a lens center than a transmittance at a lens end portion.

4. The system according to claim 3, wherein the transmittance of the light beam having the wavelength λ of the lens monotonically decreases from the lens center toward the lens end portion.

5. The system according to claim 4, wherein, in the micro concavo-convex structure in the lens surface, a difference in heights of a top of a convex and a bottom of a concave monotonically decreases from the lens center toward the lens end portion in a scanning direction.

6. The system according to claim 1, wherein the micro concavo-convex structure in the lens surface is a hole structure.

7. The system according to claim 1, wherein the lens unit includes a plurality of lenses, and at least one lens among the plurality of lenses has the micro concavo-convex structure in the optical surface.

8. The system according to claim 7, wherein two or more optical surfaces of the plurality of lenses have the micro concavo-convex structure.

9. The system according to claim 8, further comprising:
a first lens and a second lens,
wherein the first lens or the second lens has the micro concavo-convex structure in optical surfaces opposite each other.

10. The system according to claim 9, wherein each of the first lens and the second lens has the micro concavo-convex structure in both of the optical surfaces opposite each other.

11. An apparatus comprising:
a scanning device including a system, wherein the system comprises:
a light source;
a deflection unit configured to deflect a light beam having a wavelength λ emitted from the light source; and
a lens unit on which the deflected light beam having the wavelength λ is incident and which includes a lens configured to focus the incident light beam having the wavelength λ on a surface to be scanned,
wherein the lens, by having a micro concavo-convex structure in an optical surface, has a transmittance distribution for a light beam having the wavelength λ according to a light quantity distribution of the deflected light beam having the wavelength λ and incident on the lens unit;
a photosensitive drum disposed on a surface to be scanned of the optical scanning device;
a developing unit configured to develop, as a toner image, an electrostatic latent image formed by a light beam scanning the photosensitive drum;
a transfer unit configured to transfer the developed toner image on a sheet; and
a fixing unit configured to fix the transferred toner image on the sheet.

12. The apparatus according to claim 11, wherein the light beam having passed through the lens unit has a smaller optical distribution than the light beam before passing through the lens unit.

13. The apparatus according to claim 11, wherein the lens has a larger transmittance at a lens center than a transmittance at a lens end portion.

14. The apparatus according to claim 13, wherein the transmittance of the light beam having the wavelength λ of the lens monotonically decreases from the lens center toward the lens end portion.

15. The apparatus according to claim 14, wherein, in the micro concavo-convex structure in the lens surface, a difference in heights of a top of a convex and a bottom of a concave monotonically decreases from the lens center toward the lens end portion in a scanning direction.

16. The apparatus according to claim 11, wherein the micro concavo-convex structure in the lens surface is a hole structure.

17. The system according to claim 11, wherein the lens unit includes a plurality of lenses, and at least one lens among the plurality of lenses has the micro concavo-convex structure in the optical surface.

18. The apparatus according to claim 17, wherein two or more optical surfaces of the plurality of lenses have the micro concavo-convex structure.

19. The apparatus according to claim 18, wherein the system further comprises:
a first lens and a second lens,
wherein the first lens or the second lens has the micro concavo-convex structure in optical surfaces opposite each other.

20. The apparatus according to claim 19, wherein each of the first lens and the second lens has the micro concavo-convex structure in both of the optical surfaces opposite each other.

* * * * *